(12) United States Patent
Krahl et al.

(10) Patent No.: US 9,021,770 B2
(45) Date of Patent: May 5, 2015

(54) SEALING STATION

(75) Inventors: Wolfgang Krahl, Laupheim (DE);
Ulrich Engelhardt, Laupheim (DE);
Guido Fuchsloch, Altheim (DE)

(73) Assignee: Uhlmann Pac-Systeme GmbH & Co. KG, Laupheim (DE)

( * ) Notice: Subject to any disclaimer, the term of this patent is extended or adjusted under 35 U.S.C. 154(b) by 777 days.

(21) Appl. No.: 12/945,165

(22) Filed: Nov. 12, 2010

(65) Prior Publication Data

US 2011/0120064 A1 May 26, 2011

(30) Foreign Application Priority Data

Nov. 25, 2009 (DE) .................. 10 2009 047 151

(51) Int. Cl.
| | |
|---|---|
| B65B 7/28 | (2006.01) |
| B29C 65/18 | (2006.01) |
| B29C 65/00 | (2006.01) |
| B65B 7/16 | (2006.01) |
| B29C 65/30 | (2006.01) |
| B29L 31/00 | (2006.01) |
| B65B 31/02 | (2006.01) |

(52) U.S. Cl.
CPC .............. *B29C 65/18* (2013.01); *B29C 66/003* (2013.01); *B29C 66/112* (2013.01); *B29C 66/131* (2013.01); *B29C 66/348* (2013.01); *B29C 66/53461* (2013.01); *B29C 66/849* (2013.01); *B29L 2031/7164* (2013.01); *B65B 7/164* (2013.01); *B65B 31/028* (2013.01); *B29C 65/305* (2013.01); *B29C 66/81811* (2013.01); *B29C 66/81431* (2013.01)

(58) Field of Classification Search
USPC .......... 53/329, 329.3, 373.7, 374.2, 478, 476, 53/269
See application file for complete search history.

(56) References Cited

U.S. PATENT DOCUMENTS

| | | | | |
|---|---|---|---|---|
| 2,918,767 | A | * 12/1959 | Grinstead et al. ............... | 53/511 |
| 3,481,100 | A | * 12/1969 | Bergstrom ....................... | 53/433 |
| 3,628,306 | A | 12/1971 | Jacobson et al. | |
| 3,659,393 | A | * 5/1972 | Richter ........................... | 53/433 |
| 3,706,174 | A | * 12/1972 | Young et al. .................... | 53/510 |
| 4,058,953 | A | * 11/1977 | Sanborn et al. ................. | 53/433 |
| 4,296,588 | A | * 10/1981 | Vetter .............................. | 53/86 |
| 4,982,555 | A | * 1/1991 | Ingemann ....................... | 53/405 |
| 5,331,791 | A | 7/1994 | Fux et al. | |

FOREIGN PATENT DOCUMENTS

| | | |
|---|---|---|
| DE | 3404451 A1 | 8/1985 |
| DE | 602004007195 T2 | 3/2008 |

(Continued)

OTHER PUBLICATIONS

European Search Report EP 10189516 (Mar. 3, 2011).

*Primary Examiner* — Sameh Tawfik

(74) *Attorney, Agent, or Firm* — Brinks Gilson & Lione

(57) ABSTRACT

The sealing station in a thermoforming machine for sealing a cover sheet to a bottom sheet having pocket-like depressions to hold products includes a first mold and a second mold, the second mold having cavities to accept the pocket-like depressions in the bottom sheet. The sealing station further has a vent system, which involves an inlet channel and an outlet channel in an area of each of the cavities so that, during a sealing operation, a vent space is formed between each depression in the bottom sheet and each cavity, and air entering through the respective inlet channel passes over the depression in the bottom sheet in the vent space and escapes through the respective outlet channel.

10 Claims, 3 Drawing Sheets

(56) References Cited

FOREIGN PATENT DOCUMENTS

| | | |
|---|---|---|
| EP | 083323 A2 | 7/1983 |
| JP | 11 245905 A | 9/1999 |
| WO | WO 85/03487 A1 | 8/1985 |

* cited by examiner

SEALING STATION

RELATED APPLICATIONS

The present patent document claims the benefit of priority to German Patent Application No. DE 102009047151.0, filed Nov. 25, 2009, and entitled "SEALING STATION," the entire contents of each of which are incorporated herein by reference.

FIELD AND BACKGROUND

The present invention pertains to a sealing station in a thermoforming machine for sealing a cover sheet to a bottom sheet.

Thermoforming machines are known as a component of blister packaging machines. They comprise a forming station, in which a plurality of pocket-like depressions or wells is formed in a bottom sheet, which can consist, for example, of plastic or aluminum or a combination of the two. In a downstream filling station, a product, such as a pharmaceutical tablet, is laid into each of these pockets. After the pockets have been filled with the product, the bottom sheet is sent to a sealing station. Just in front of the sealing station or inside it, a cover sheet is supplied and laid on top of the bottom sheet. Through the action of heat inside the sealing station, the cover sheet is sealed tightly to the bottom sheet, as a result of which the product is sealed in the pockets or pocket-like depressions.

A sealing station generally consists of a first or upper mold, which is heated, for example, by heating cartridges, and a second or lower mold, which represents the counterpart to the first mold and comprises cavities for holding the bottom sheet with its pocket-like depressions. Because the facing surfaces of the cover sheet and bottom sheet are pressed against each other and thus are at least partially welded together, a great deal of heat is transferred during the sealing operation from the upper mold to the cover sheet and also to the bottom sheet.

Although heat is transferred only during the actual sealing time, the layers of high thermal conductivity present within the composite sheet structure, the materials of which can comprise aluminum, lead to the result that the heating of the composite sheet structure consisting of the cover sheet and bottom sheet affects the product lying in the cavities and sealed in on all sides by the composite sheet structure. In the case of certain products, especially sensitive pharmaceutical capsules, for example, a maximum temperature may not be exceeded at any time during the packaging process, because otherwise the product could suffer damage, in the worst case even decomposition could occur. For this reason the second or lower mold must be kept at a predetermined cooling temperature which may not be exceeded. At the same time, the composite sheet structure must be cooled down immediately after the sealing operation.

For this purpose, the lower molds of thermoforming machines usually comprise a water cooling system, wherein, in the lower mold, channels filled with cooling water are present, which ensure in particular that the temperature of the lower mold does not increase through contact with the heated upper mold during the sealing time but instead remains below a certain temperature threshold.

U.S. Pat. No. 3,628,306 discloses a device for packaging articles between two heat-sealable plastic sheets. During the sealing operation, the composite sheet structure is cut along the product-free sealing area by a knife held perpendicular to the composite sheet structure. To cool the composite sheet structure in this area so that uniform cutting is ensured, air slots are provided in the lower mold. This device, however, does not cool the product enclosed by the composite sheet structure but rather only the sections of the sheet structure lying in the sealing area. A device of this type is therefore unsuitable for especially heat-sensitive products.

DE 34 04 451 A1 describes a packaging machine with an evacuation and sealing station for welding monofilms by means of a continuously heatable welding element. So that the monofilm is not destroyed by contact with the continuously heated welding element, a control unit is provided, which is designed so that it generates a pressure difference in the interior of the chamber between the pressure above the upper film and the pressure below it, so that the upper film always lies taut on the product and on the lower film during and also after contact with the welding element. Only after a cooling phase is the pressure difference removed, so that the package with the film, which has now been stabilized again, can be lifted and sent further along. In the lower mold of the evacuation and sealing station, channels are formed, through which a negative pressure is generated so that the film and the product rest directly on the top surface of the lower mold.

BRIEF SUMMARY

It is an object of the present invention to provide a sealing station which can efficiently process temperature-sensitive products without damage. Further, the sealing station should take into account the shrinkage of the bottom sheet in the lower mold, and it is desired that the lower mold does not have to be replaced when the shape of the pocket-like depressions in the bottom sheet is changed.

According to an aspect of the invention, the sealing station in a thermoforming machine for sealing a cover sheet to a bottom sheet having pocket-like depressions to hold products comprises a first mold and a second mold, the second mold having cavities to accept the pocket-like depressions in the bottom sheet. The sealing station further comprises a vent system, which involves an inlet channel and an outlet channel in an area of each of the cavities so that, during a sealing operation, a vent space is formed between each depression in the bottom sheet and each cavity, and air entering through the respective inlet channel passes over the depression in the bottom sheet in the vent space and escapes through the respective outlet channel.

The presence of the vent space means that, between the pocket-like depression in the bottom sheet and the cavity in the lower mold, there is an area which prevents the air entering through the inlet channel from either damaging or changing the surface of the pocket-like depression. This guarantees that one and the same mold can be used for various shapes of the pocket-like depressions in the bottom sheet. Shrinkage of the bottom sheet is taken into account, because the vent system means that there is no need for the pocket-like depressions in the bottom sheet to rest precisely in the cavity.

It may be advantageous to provide several inlet channels and/or several outlet channels per cavity.

It is especially advantageous that the vent system is able to transfer heat from the depressions in the bottom sheet to the air in the vent space and thus to dissipate this heat during the sealing operation. The air stream which is supplied through the inlet channel or inlet channels is therefore able to carry the heat transferred from the upper mold to the composite sheet structure consisting of the cover sheet and the bottom sheet away from the bottom sheet, so that the heating of the sealed-in product is effectively reduced or completely prevented.

A compressed air supply is preferably provided in such a way that, upon arrival of the air in the vent space, no static pressure is exerted on the bottom sheet. This prevents the shape of the pocket-like depressions in the bottom sheet from changing as a result of excessive pressure and also prevents the product present inside it from undergoing any possible negative effects. Through the suitable choice of the pressure of the inflowing air, no static pressure which could act on the surface of the depressions of the bottom sheet is therefore produced. On the contrary, the air in the vent space passes along the surface of the bottom sheet as it travels toward the outlet channel or outlet channels, thus acting as a heat-transfer agent.

It is especially advantageous to provide means in the inlet channel to create turbulence in the air flowing through the vent space. As a result, the greatest possible cooling effect is obtained, for a turbulent air stream has a greater heat-transfer effect on the bottom sheet and thus on the product to be cooled than, for example, a laminar flow does. The turbulence can be produced, for example, by installing vortex-generating grates or compartments in the inlet channel. The cross section of the inlet channel can also help to increase the turbulence; it does not have to be circular or rectangular. The cross section can change over the length of the inlet channel in such a way as to increase the turbulent effect.

It is advantageous in particular for the air inlet angle between the inlet channel and the cavity to be less than 90°, and more preferably between 30° and 70°. In comparison with an inlet angle of 90°, a slanted inlet angle leads to a more turbulent flow and thus to a better cooling action. Within the scope of the invention, it is also possible for the inlet channel or inlet channels to be neither centrally nor symmetrically arranged with respect to the cavity in the second mold.

It is also advantageous to arrange the outlet channel or outlet channels in such a way that the route between the inlet channel and the outlet channel or outlet channels has the maximum possible length in the vent space. As a result of this longer route, the surface area in the vent space along which the air passing by can carry away heat from the bottom sheet is also increased.

In a preferred embodiment, the sealing station is designed as a plate sealing station. The cover sheet and the bottom sheet are supplied in cycles, and the second mold comprises several cavities to hold the pocket-like depressions in the bottom sheet. It is especially preferred that each inlet channel be connected to a common central chamber, which is fed by a compressed air source. This ensures a uniform pressure distribution. In addition, a single compressed air source can accomplish the cooling of the entire lower mold.

Alternatively, it can be advantageous to design the inventive sealing station as a roller type sealing station. The principle of such roller type sealing stations is generally known; the special feature, however, is that, in addition to a water cooling system in the bottom roller, this roller also has a vent system, which ensures a cooling action along the sealing line and also over a certain predetermined distance after that.

BRIEF DESCRIPTION OF THE DRAWINGS

Further features and advantages of the sealing station according to the invention are now to be explained in greater detail in the following description, which refers to the attached drawings.

DETAILED DESCRIPTION OF SPECIFIC EMBODIMENTS

Figure 1:
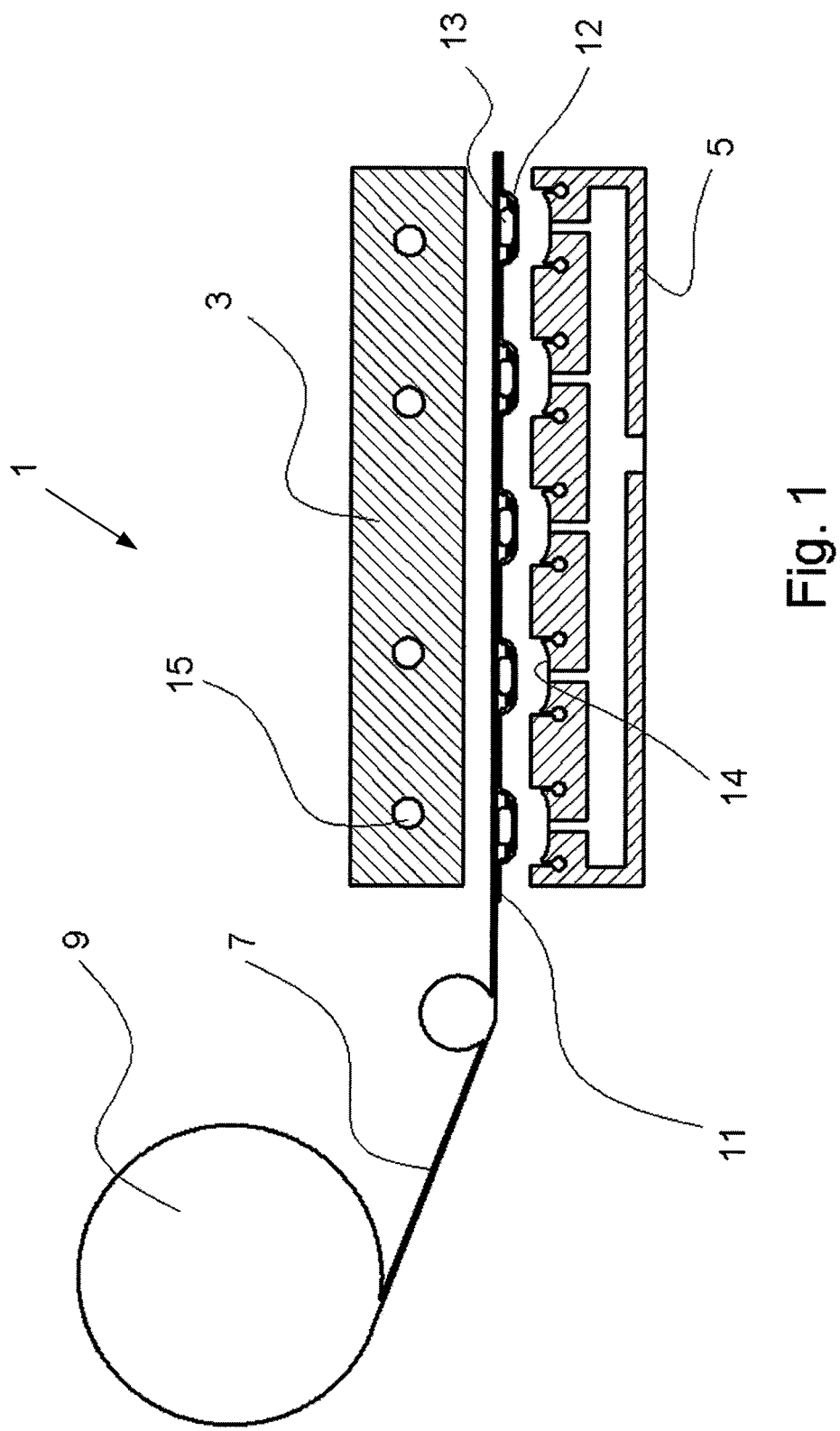
FIG. 1 is a cross-sectional side view of a specific embodiment of the sealing station according to the invention in the opened state.

FIG. 1 is a cross-sectional side view of a specific embodiment of the sealing station according to the invention in the open state. The sealing station 1 has a first or upper mold 3 and a second or lower mold 5, which are arranged parallel to each other and between which a cover sheet 7, unwound from a roll 9 of cover sheet material, and a bottom sheet 11, lying directly underneath, extend.

The bottom sheet 11 comprises pocket-like depressions 12, in each of which a product 13, in particular a pharmaceutical product, to be sealed is located. The upper mold 3 is heated to a predetermined sealing temperature by, for example, heat cartridges 15. The lower mold 5 is usually held at a second, predetermined cooling temperature by a water cooling system (not shown). The corresponding temperatures are adjusted and regulated by control units (not shown) in suitable fashion so that an optimal sealing effect is always achieved and the sealed, molded composite structure consisting of the cover sheet 7 and the bottom sheet 11 does not exceed a certain temperature threshold. In the embodiment shown here, the upper mold 3 and the lower mold 5 are moved up and down by suitable drives (not shown) in correspondence with the cycling of the plate sealing station 1, wherein, in the present case, five rows of pocket like depressions 12, arranged one behind the other to hold the products 13, are sealed in a single sealing operation. The arrangement of the pocket-like depressions 12 is therefore two-dimensional.

Figure 2:
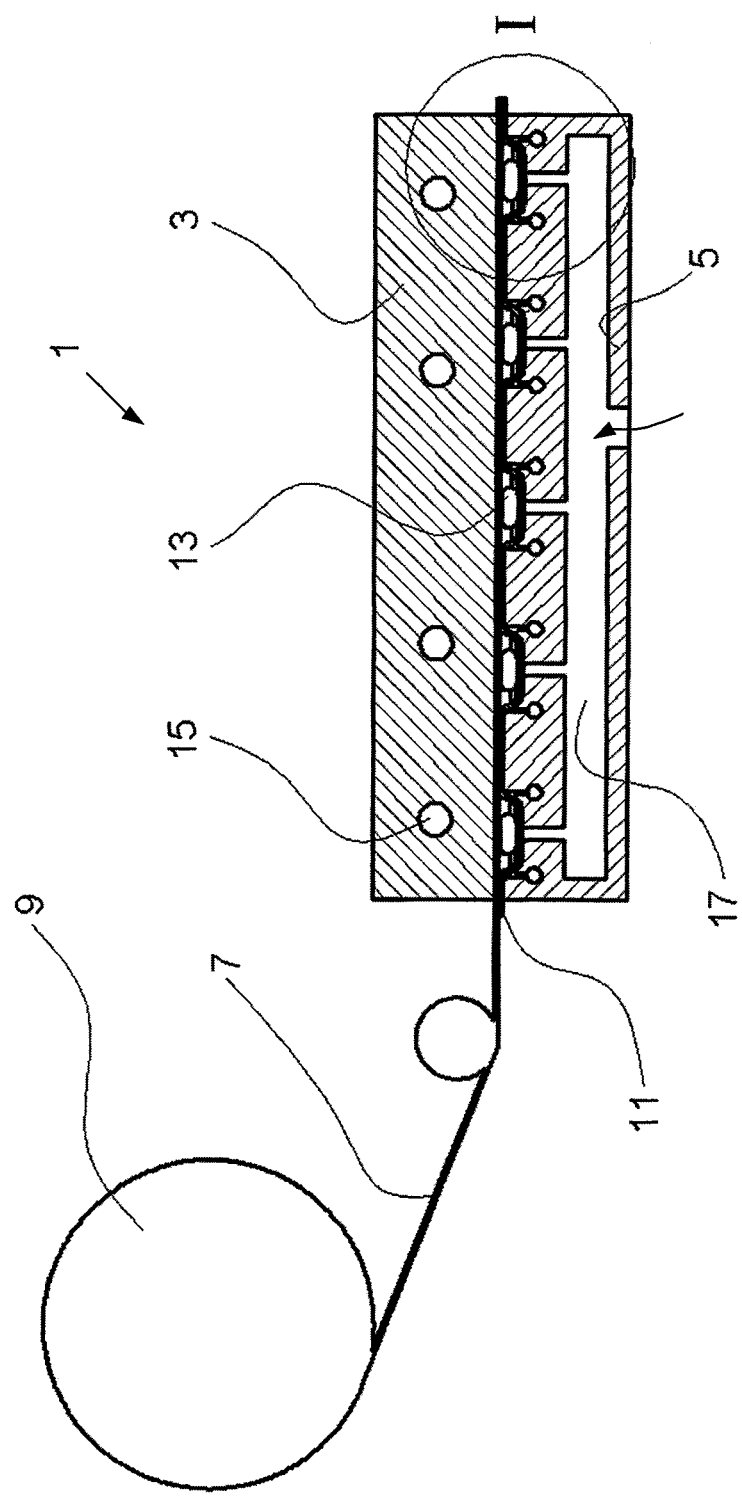
FIG. 2 is a cross-sectional side view of the embodiment of FIG. 1 in the closed sealing state.

FIG. 2 shows the plate sealing station 1 of FIG. 1 in the closed state, that is, at the time when the cover sheet 7 and the bottom sheet 11 are sealed to each other to produce a composite sheet structure. For this purpose, the upper mold 3 and the lower mold 5 are moved toward each other and held in the position shown for a predetermined period of time, called the "sealing time", wherein the bottom surface of the upper mold presses the cover sheet 7 onto the bottom sheet 11 resting on the top surface of the lower mold 5. The heat of the upper mold 3 is thus transferred to the cover sheet 7, which in the usual case consists of hard aluminum, aluminum of defined hardness, or of an aluminum foil laminated with paper or plastic. As a result of the pressing of the cover sheet 7 onto the bottom sheet 11 and the partial welding of the two sheets to each other, a sheet structure is obtained in which, by virtue of the properties of the sheet materials, thermal energy is transferred to the bottom sheet 11. The material of the bottom sheet is usually PVC, PVD-PVDC, or PVC-ACLAR, but other materials can also be used such as laminated aluminum foils, COC, PS, PP, or PET. The greater the thermal conductivity of the bottom sheet material, the greater the heat transfer.

As previously mentioned, the embodiment illustrated in the drawings is a plate sealing station, in which a sealing process takes place in cycles. After the station has been opened again from the closed state shown in FIG. 2, the sealed and thus heated composite sheet structure is sent to a cooling station.

Figure 3:
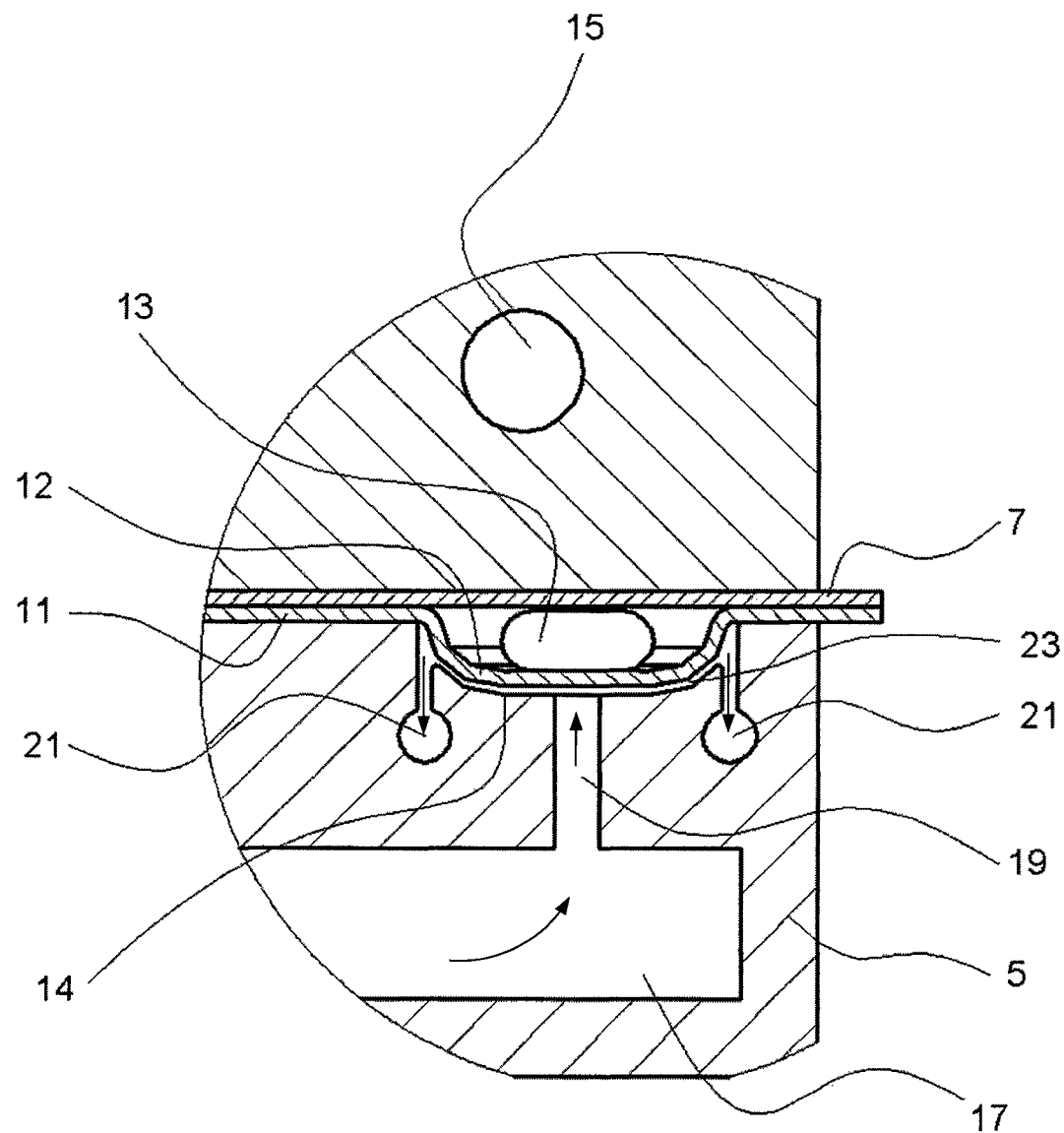
FIG. 3 shows a part of the embodiment of FIG. 2 on an enlarged scale.

FIG. 3 shows the area marked "I" in FIG. 2 on a larger scale. The way in which the sealing station operates is explained in detail below on the basis of FIG. 3. In the lower mold 5, a central or middle channel 17 is formed, from which an inlet channel 19 extends to each cavity 14. The contour of the cavity 14 is oriented around the contour of the pocket-like depression 12 in the bottom sheet 11. It should be noted here that, although an exact correspondence of the contour of the cavity 14 to the contour of the pocket-like depression 12 is desirable, for the sake of low-cost production and because of the shrinkage of the bottom sheet, such exact correspondence is not feasible. Between the cavity 14 and the pocket-like depression 12 in the bottom sheet 11 present in it, a vent space 23 is formed, which extends over the entire surface of the cavity 14. Outlet channels 21, here constituting the lateral boundaries of the cavity 14, are formed in the lower mold 5.

Compressed air from a compressed air source (not shown) is supplied to the central channel 17; entering through the inlet channel 19, this air arrives in the vent space 23 in each cavity 14. It should be noted that the air introduced into the vent space 23 does not result in any static pressure which could act on the pocket-like depressions 12 in the bottom sheet 11 and thus deform or damage the bottom sheet 11. This is important, because deformation or damage to the bottom sheet 11 is unacceptable for quality reasons. Instead, the air passes in the form of a turbulent air flow through the vent space 23 from the inlet channel 19 to the outlet channels 21. The heat present in the bottom sheet 11, i.e., the heat which was transferred by the sealing operation from the upper mold 3 via the cover sheet 7, is transferred in turn to the air which is passing by and is thus carried away. As a result, the bottom sheet 11 is cooled in the area of the vent space 23. This in turn has the result that the product 13 located between the cover sheet and the bottom sheet is also cooled and thus protected from the damage which could be caused by heat.

In the embodiment shown here, only one inlet channel 19 is shown per cavity 14, this channel arriving at the cavity 14 at an angle of 90°. It is especially advantageous for the angle of incidence of the inlet channel 19 to the cavity 14 to be not exactly 90° but rather, for example, between 30° and 70°. This leads to greater turbulence of the air flow and thus to a greater heat-transfer effect from the cover sheet 11 to the air passing by. It is also possible to provide several inlet channels 19 per cavity 14. The same applies to the outlet channels; that is, one or more outlet channels 21 can be present per cavity 14. In this way, when the compressed air is supplied to the interior of the mold 5, it is possible to generate a defined air flow in the vent space 23, the cooling effect of which can be adjusted as required. For the cooling effect, the temperature of the incoming air is also important, and accordingly it is conceivable that, to increase the cooling effect, highly cooled compressed air could be used. It is also possible to use only certain gases such as nitrogen or compressed carbon dioxide or to add them to the compressed air to exert a positive effect on the cooling action.

It is easy to see on the basis of the explanations given above that designing the vent space so that it occupies the largest possible area around the pocket-like depression 12 will result in an especially intense cooling action.

As an alternative to the embodiment of the sealing station described above, the sealing station can also be designed as a roller type sealing station. In such roller type sealing stations, the upper mold corresponds to the sealing roller and the lower mold to the bottom roller. The cover sheet and the bottom sheet pass through the two rollers and are sealed continuously to each other at the sealing line, that is, at the point where the sealing roller and the bottom roller contact each other. The bottom roller comprises cavities uniformly spaced around its periphery, into which the pocket-like depressions of the bottom sheet correspondingly fit. The additional cooling beyond that achieved by the water cooling system of the bottom roller is provided by corresponding inlet and outlet channels at the cavities in the bottom roller. The routing of the air in the bottom roller is similar in principle to that shown in FIG. 3. The air cooling is activated at the time when sealing begins and lasts until the composite sheet structure has left the bottom roller.

The present invention thus provides a sealing station in which temperature-sensitive products can be effectively processed without damage.

The invention claimed is:

1. A sealing station in a thermoforming machine for sealing a cover sheet to a bottom sheet having pocket-like depressions to hold products, the sealing station comprising:
a first mold and a second mold, the second mold comprising cavities to accept the pocket-like depressions in the bottom sheet; wherein said first and second molds are operable between an opened state and a closed sealing state in which a bottom surface of the first mold presses the cover sheet onto the bottom sheet resting on a top surface of the second mold, and heat of the first mold is transferred to the cover sheet, and thereby a sealing operation is carried out by partial welding of the cover sheet onto the bottom sheet; and
a vent system, which comprises an inlet channel and an outlet channel in an area of each of the cavities, wherein a vent space is formed between each depression in the bottom sheet and each cavity, wherein, in the closed sealing state of the first and second molds, said inlet channel and said outlet channel are in communication with the vent space, and wherein in the closed sealing state air entering through the respective inlet channel during the sealing operation passes over the depression in the bottom sheet in the vent space and escapes through the outlet channel.

2. The sealing station according to claim 1, wherein two outlet channels are provided per each cavity.

3. The sealing station according to claim 1, wherein the vent system comprises a compressed air supply which is designed so that, upon introduction of the air into the vent space, no static pressure is exerted on the bottom sheet.

4. The sealing station according to claim 1, wherein turbulence creating means are provided in the inlet channel to create turbulence in the air flowing through the vent space.

5. The sealing station according to claim 1, wherein an air inlet angle between the inlet channel and each cavity is less than 90°.

6. The sealing station according to claim 5, wherein the air inlet angle between the inlet channel and each cavity is between 30° and 70°.

7. The sealing station according to claim 1, wherein the outlet channel is arranged in such a way that a route between the inlet channel and the outlet channel has a maximum possible length in the vent space.

8. The sealing station according to claim 1, wherein it is designed as a plate sealing station.

9. The sealing station according to claim 8, wherein each inlet channel is connected to a common central chamber, which is fed from a compressed air supply.

10. The sealing station according to claim 1, wherein it is designed as a roller type sealing station.

* * * * *